US008570241B2

(12) United States Patent
Choi (10) Patent No.: US 8,570,241 B2
(45) Date of Patent: Oct. 29, 2013

(54) IMAGE DISPLAY APPARATUS FOR CONTROLLING AN EXTERNAL DATA TRANSMITTING DEVICE USING A USB CONNECTOR AND A METHOD THEREOF (75) Inventor: Chang-ik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1069 days.

(21) Appl. No.: 11/877,053

(22) Filed: Oct. 23, 2007

(65) Prior Publication Data
US 2008/0218505 A1 Sep. 11, 2008

(30) Foreign Application Priority Data

Mar. 8, 2007 (KR) ........................ 10-2007-0022979

(51) Int. Cl.
G09G 5/00 (2006.01)
G06F 3/038 (2013.01)

(52) U.S. Cl.
USPC ............. 345/1.2; 345/1.1; 345/204; 345/211; 710/38; 710/62; 710/63

(58) Field of Classification Search
USPC ......... 345/156–173, 1.1–6, 204–216; 710/62, 710/38, 63
See application file for complete search history.

(56) References Cited

U.S. PATENT DOCUMENTS

| 6,072,472 A * | 6/2000 | Shiga ............................ 345/168 |
| 6,336,155 B1 * | 1/2002 | Ito et al. ......................... 710/37 |
| 6,624,797 B1 * | 9/2003 | Wheeler et al. ................ 345/1.2 |
| 6,738,856 B1 * | 5/2004 | Milley et al. ................... 710/315 |
| 6,874,041 B1 * | 3/2005 | Burd et al. ...................... 710/38 |
| 6,995,742 B2 * | 2/2006 | Park et al. ...................... 345/100 |
| 7,523,241 B2 * | 4/2009 | Konishi ......................... 710/302 |
| 7,769,930 B2 * | 8/2010 | Huang ............................ 710/62 |
| 2001/0050679 A1 * | 12/2001 | Shigeta ......................... 345/204 |
| 2003/0020757 A1 * | 1/2003 | Aratani et al. ................. 345/790 |
| 2005/0225547 A1 * | 10/2005 | Choi ............................. 345/211 |

(Continued)

FOREIGN PATENT DOCUMENTS

| CN | 1758709 A | 4/2006 |
| CN | 1893643 A | 1/2007 |
| KR | 1999-0065815 A | 8/1999 |
| KR | 10-2007-0019107 A | 2/2007 |

OTHER PUBLICATIONS

Chinese Office Action issued Jul. 14, 2010, issued in Application No. 200710305218.8.

(Continued)

Primary Examiner — Alexander Eisen
Assistant Examiner — Patrick F Marinelli
(74) Attorney, Agent, or Firm — Sughrue Mion, PLLC (57) ABSTRACT An image display apparatus which controls an external device transmitting data using a USB connector is provided. The image display apparatus includes a first connector and a second connector which receive an image signal, respectively, a display unit which selectively displays the image signal input via the first connector and the second connector, and if the image signal input via the first connector is displayed on the display unit, a central processing unit (CPU) which stops an external device connected via the second connector from transmitting an image signal. Accordingly, resources in the external device can be efficiently managed by stopping unnecessary operations.

15 Claims, 4 Drawing Sheets

(56) References Cited

U.S. PATENT DOCUMENTS

| | | | |
|---|---|---|---|
| 2005/0232306 A1* | 10/2005 | Lu | 370/490 |
| 2006/0145941 A1* | 7/2006 | Park et al. | 345/1.1 |
| 2007/0036158 A1* | 2/2007 | Hun-Kwon et al. | 370/389 |
| 2007/0220150 A1* | 9/2007 | Garg | 709/226 |
| 2008/0084834 A1* | 4/2008 | Stanek | 370/284 |
| 2008/0162752 A1* | 7/2008 | Huang | 710/63 |
| 2009/0027490 A1 | 1/2009 | Hirai et al. | |

OTHER PUBLICATIONS

"USB Universal Serial Bus Specification Version 1.0", Universal Serial Bus (USB), XX, XX, Jan. 15, 1996, pp. 1-268, XP002917782.

Communication dated Dec. 20, 2010, issued in corresponding European Patent Application No. 07119736.2.

Communication dated Mar. 31, 2013 issued by the Korean Intellectual Property Office in counterpart Korean Patent Application No. 10-2007-0022979.

* cited by examiner

IMAGE DISPLAY APPARATUS FOR CONTROLLING AN EXTERNAL DATA TRANSMITTING DEVICE USING A USB CONNECTOR AND A METHOD THEREOF

CROSS-REFERENCE TO RELATED APPLICATIONS

This application claims priority under 35 U.S.C. §119(a) of Korean Patent Application No. 10-2007-0022979, filed in the Korean Intellectual Property Office on Mar. 8, 2007, the entire disclosure of which is incorporated herein by reference.

BACKGROUND OF THE INVENTION

1. Field of the Invention

Apparatuses and methods consistent with the present invention relates to an image display apparatus which controls an external data transmitting device from unnecessarily using its resource.

2. Description of the Related Art

Monitors are representing examples of display apparatuses, which are mainly used for displaying an image transmitted from a personal computer (PC) on screen.

In general, a monitor includes a digital visual interface (DVI) connector and/or a D-sub connector as a connector which receives an image from a PC. Also, a PC includes a DVI connector and/or a D-sub connector corresponding to those of the monitor in order to transmit an image to a monitor. Nowadays, a monitor can receive and display an image from a PC using a USB connector.

A monitor can concurrently receive image signals via a plurality of connectors connected to a PC at the same time. For example, a monitor can receive a first image signal via a DVI connector, a second image signal via a D-sub connector, and a third image signal via a USB connector at the same time.

In this case, a PC encodes each image signal in order to transmit the signals via each connector. However, the monitor selects and displays one image signal from among the plurality of image signals.

A related art monitor generally cannot control non-selected image signals. Therefore, a PC keeps encoding and transmitting non-selected image signals so that resources of a central processing unit (CPU) is unnecessarily occupied.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an image display apparatus which generates a control signal to stop an external device from transmitting an USB image signal and controls the external device so as to secure availability of resources by reducing unnecessary consumption of the resources of the external device.

In order to achieve the above-described aspects of the present invention, there is provided an image display apparatus, comprising a first connector and a second connector which receive an image signal, respectively, a display unit which selectively displays the image signal input via the first connector and the second connector, and a central processing unit (CPU) which causes an external device connected via the second connector to stop transmitting an image signal, if the image signal input via the first connector is displayed on the display unit.

If the image signal input via the first connector is displayed on the display unit, the CPU may generate a control signal for requesting interruption of image signal transmission and transmit the generated control signal to the external device via the second connector.

The image display apparatus further may comprise a signal processing unit which decodes the image signal input via the second connector, and transmits the control signal to the external device via the second connector if the CPU generates the control signal.

If the image signal input via the first connector is displayed on the display unit, the CPU may convert the second connector to a disabled state so that the external device stops transmitting the image signal.

The image display apparatus may further comprise a power switch which supplies a driving power to the second connector, wherein if the image signal input via the first connector is displayed on the display unit, the CPU controls the power switch to cut off the driving power.

If the image signal input via the first connector is displayed on the display unit, the CPU may disable a data transmission line which connects the second connector to the external device so that the external device stops transmitting the image signal.

The second connector may receive the image signal from the external device in accordance with universal serial bus (USB) standard.

The first connector may comprise at least one of a digital visual interface (DVI) connector and D-sub connector, and the second connector comprises a USB connector.

The image display apparatus may further comprise an input unit which selects one of the first connector and the second connector, wherein the CPU controls the display unit to display the image signal input via a connector selected through the input unit.

In another aspect of the present invention, there is provided a method for controlling an image display apparatus comprising a first connector and a second connector, the method comprising receiving an image signal via the first connector and the second connector, respectively, if one of the first connector and the second connector is selected, displaying the image signal input via the selected connector, and if the image signal input via the first connector is displayed, stopping an external device connected via the second connector from transmitting the image signal.

In the stopping, a control signal for requesting interruption of image signal transmission may be generated and transmitted to the external device via the second connector if the image signal input via the first connector is displayed.

In the stopping, if the image signal input via the first connector is displayed, the second connector may be converted to a disabled state so that the external device stops transmission of the image signal.

In the stopping, if the image signal input via the first connector is displayed, the second connector may be converted to a disabled state by cutting off a driving power supplied to the second connector.

In the stopping, if the image signal input via the first connector is displayed, a data transmission line which connects the second connector to the external device may be disabled so that the external device stops transmission of the image signal.

The second connector may receive the image signal from the external device in accordance with universal serial bus (USB) standard.

The first connector may comprise at least one of a digital visual interface (DVI) connector and D-sub connector, and the second connector may comprise a USB connector.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EXEMPLARY EMBODIMENTS OF THE PRESENT INVENTION

Reference will now be made in detail to the present exemplary embodiments of the present invention, examples of which are illustrated in the accompanying drawings, wherein like reference numerals refer to like elements throughout. The embodiments are described below in order to explain the present invention by referring to the figures.

Figure 1:
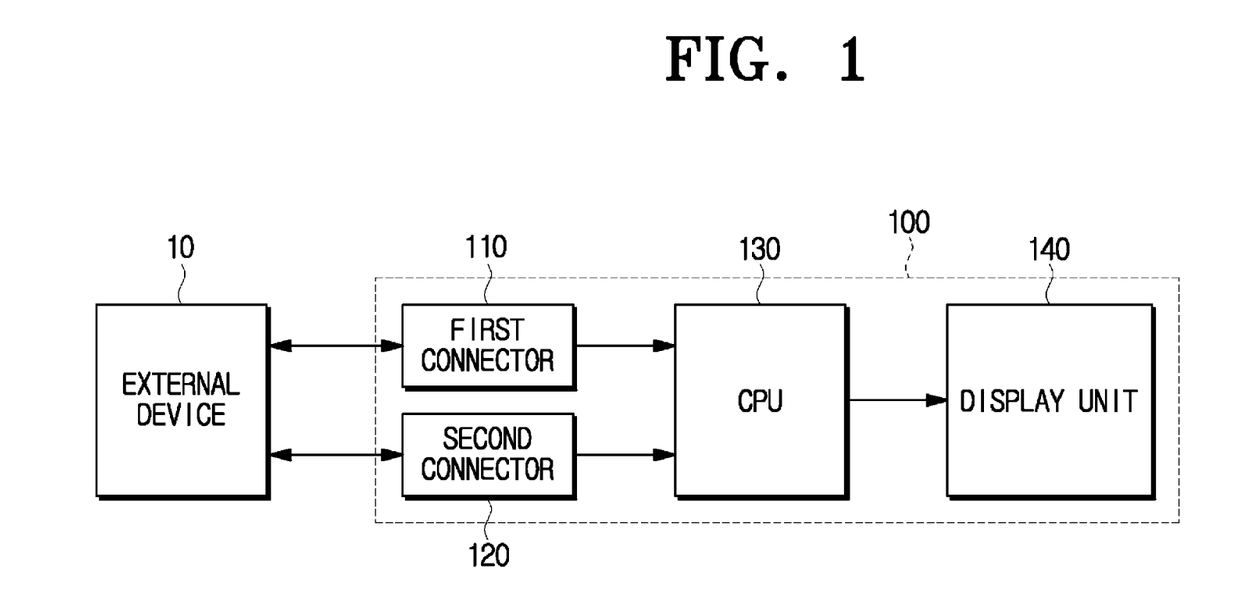
FIG. 1 is a block diagram illustrating the configuration of an image display apparatus according to an exemplary embodiment of the present invention.

FIG. 1 is a block diagram illustrating the configuration of an image display apparatus according to an exemplary embodiment of the present invention. In FIG. 1, the image display apparatus 100 includes a first connector 110 and a second connector 120 which are connected to an external device 10, a central processing unit (CPU) 130, and a display unit 140. The external device 10 may be a PC, and the image display apparatus 100 may be a monitor which is connected to the PC.

The first connector 110 and second connector 120 are connected to the external device 10 to receive image signals. The first connector 110 may be at least one of a DVI connector, a D-sub connector or a HDMI connector. In other words, the first connector 110 can be implemented as a single or a plurality of connectors. Also, the second connector 120 may be at least one of a USB connector, a USB hub, or other types of interfaces for receiving image signals. Furthermore, the controlling of the first connector 110 and the second connector 120, as explained below, may be interchanged.

If the first connector 110 is a DVI connector, the first connector 110 receives an image signal of DVI standard, or if the first connector 110 is a D-sub connector, the first connector 110 receives an image signal of D-sub standard. An image signal which the image display apparatus 100 receives via the first connector 110 is referred to hereinafter as a 'first image signal'.

The second connector 120 receives an image signal in accordance with USB standard. An image signal which the image display apparatus 100 receives via the second connector 120 is referred to hereinafter as a 'second image signal'.

The CPU 130 determines whether the first connector 110 is connected to the external device 10, and if so, determines whether an image signal is received via the first connector 110. The CPU 130 determines whether the second connector 120 is connected to the external device 10, and if so, determines whether an image signal is received via the second connector 120.

If the CPU 130 determines that image signals are received via the first and second connectors 110 and 120, an image corresponding to either the first image signal or the second image signal is selected to be displayed. The CPU 130 performs signal processing such as scaling the selected image signal into a suitable format to be output.

If the first image signal is selected, the display unit 140 displays the first image signal according to the control of the CPU 130. Either the first image signal or the second image signal can be selected by a user, and the selected image signal is recognized by the CPU 130 and is processed into a suitable format so that the image signal can be displayed on the display unit 140.

If the displayed signal is the first image signal, the CPU 130 operates the external device 10 to stop transmitting the second image signal. The operation of the CPU 130 can be implemented in various ways in accordance with exemplary embodiments. For example, the CPU 130 may stop the external device 10 from transmitting the image signal by generating a control signal and transmitting it to the external device 10, or by disabling the second connector 120. The detailed description of these methods is explained with reference to FIG. 2. If the displayed signal is the second image signal, the CPU 130 operates the external device 10 to stop transmitting the image signal by generating a control signal and transmitting it to the external device 10. Although not particularly shown, the external device may be a single device having a multiple display output ports or the external device may be a plurality of devices each having at least one display output ports.

Figure 2:
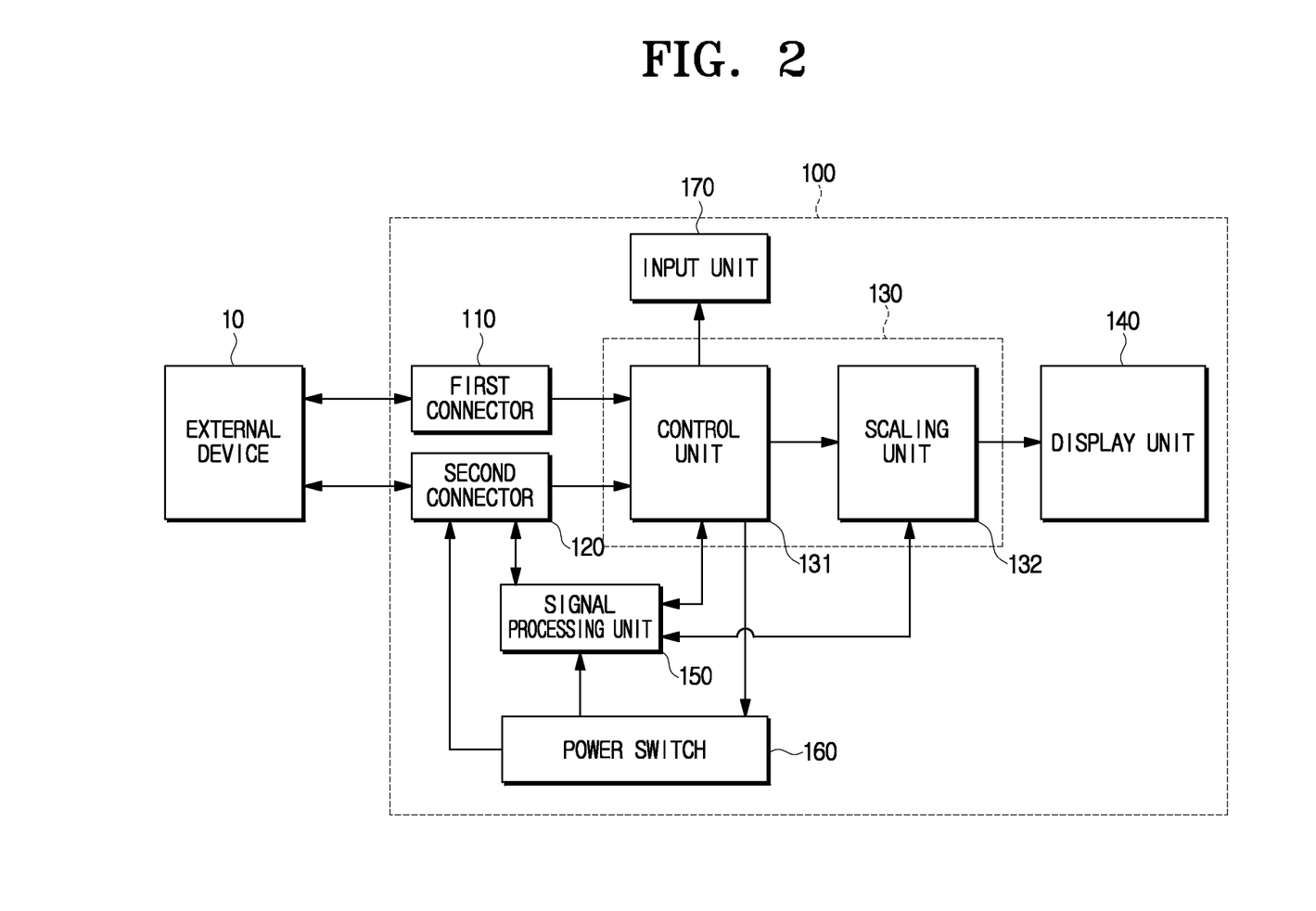
FIG. 2 is a block diagram illustrating the configuration of an image display apparatus according to another exemplary embodiment of the present invention.

FIG. 2 is a block diagram illustrating in detail the configuration of an image display apparatus according to another exemplary embodiment of the present invention. In FIG. 2, the image display apparatus 100 includes a signal processing unit 150, a power switch 160 and an input unit 170, in addition to the configuration as shown in FIG. 1. The CPU 130 includes a control unit 131 and a scaling unit 132, and may be configured as one chip in a hardware or software aspect.

The input unit 170 receives either the first connector 110 or the second connector 120. A menu for selection by a user may be generated and displayed on the display unit 140 so that the user can select the first or second connector 110, 120 through the menu.

The control unit 131 controls such that the image signal input via the connector selected through the input unit 170 is displayed. More specifically, if the second image signal is selected, the control unit 131 may cause the signal processing unit 150 and the scaling unit 132 to decode and scale second image signal for display.

The signal processing unit 150 decodes the second image signal input via the second connector 120 and outputs the decoded second image signal to the scaling unit 132. If the second connector 120 is selected through the input unit 170, the signal processing unit 150 decodes and transmits the second image signal to the scaling unit 132.

The scaling unit 132 converts the resolution of the second image signal to meet the requirement for the output, and transmits the second image signal with the converted resolution to the display unit 140. The display unit 140 displays the converted the second image signal.

In the mean time, according to an exemplary embodiment of the present invention, if the first connector 110 is selected through the input unit 170, that is, if an image signal displayed on the display unit 140 is the first image signal, the control unit 131 generates a control signal for requesting interruption of image signal transmission and transmits the control signal to the external device 10 so that the external device 10 stops the transmission of the second image signal.

In more detail, if an image signal displayed on the display unit 140 is the first image signal, the control unit 131 generates a control signal to stop the external device 10 from encoding the second image signal and transmits the generated control signal to the signal processing unit 150.

If the signal processing unit 150 receives the control signal from the control unit 131, the signal processing unit 150 stops decoding and transmits the control signal to the second connector 120. Then, the second connector 120 transmits the control signal to the external device 10, and therefore transmission of the second image signal is interrupted.

The second connector 120 is a USB-compliant connector or hub, which includes four pins to connect the external device 10 to the image display apparatus 100. The four pins may include a VCC for a power line, a DM (D−) and DP (D+) for data transmission lines, and a GND for ground.

Using the DM (D−) and DP (D+) for data lines, the second image signal can be input from the external device 10 and the control signal can be transmitted from the control unit 131 to the external device 10.

The external device 10 includes connectors (not shown) corresponding to the first connector 110 and the second connector 120 of the image display apparatus 100. In other words, the first connector 110 may be connected to a DVI connector or a D-sub connector of the external device 10, and the second connector 120 may be connected to a USB connector or a USB hub of the external device 10.

The external device 10 receives a control signal via the second connector 120 and the connector (not shown) corresponding to the second connector 120.

The external device 10 stops encoding and transmitting the second image signal in accordance with the received control signal, but maintains encoding and transmitting the first image signal to the first connector 110.

Accordingly, the external device 10 secures availability of resources by saving resources for the encoding and transmitting of the second image signal and can use the resources for other operations so that resources can be effectively used.

According to another exemplary embodiment of the present invention, if an image signal displayed on the display unit 140 is the first image signal, the control unit 131 converts the second connector 120 to a disabled state so that the external device 10 can stop transmission of the second image signal.

In more detail, the control unit 131 stops the external device 10 from transmitting the second image signal by disabling the data transmission lines (DM and DP) of the second connector 120. In this case, as requests and responses regarding transmission of USB data are not performed, the external device 10 can automatically recognize the disconnection from the second connector 120. Accordingly, the external device 10 stops encoding and transmitting the second image signal.

If an image signal displayed on the display unit 140 is the first image signal, the control unit 131 may stop the external device 10 from transmitting the second image signal by controlling the power switch 160.

The power switch 160 provides the second connector 120 with a driving power, and can temporarily cut off the power to the second connector 120 in accordance with control of the control unit 131.

In more detail, the control unit 131 may generate a control signal for disabling the power line VCC of the second connector 120 and transmit the generated control signal to the power switch 160. The power switch 160 opens the power line VCC of the second connector 120. At this time, the external device 10 recognizes that a device is disconnected from the USB connector, so the operation for the second image signal is stopped.

In other words, the external device 10 can recognize, using a plug & play (PnP) function provided by the USB, the disconnection from the second connector 120. The first image signal is continuously input via the first connector 110.

As a result, the control unit 131 can control transmission of the second image signal of the external device 10 directly or indirectly, so the external device 10 can use resources efficiently. In the case of disabling or shutting off the power of the external device connected to the types of connectors other than the USB, the control signal may be sent by the display apparatus 100 using other types of communication standards such as the DDC (Display Data Channel) standard.

Figure 3:
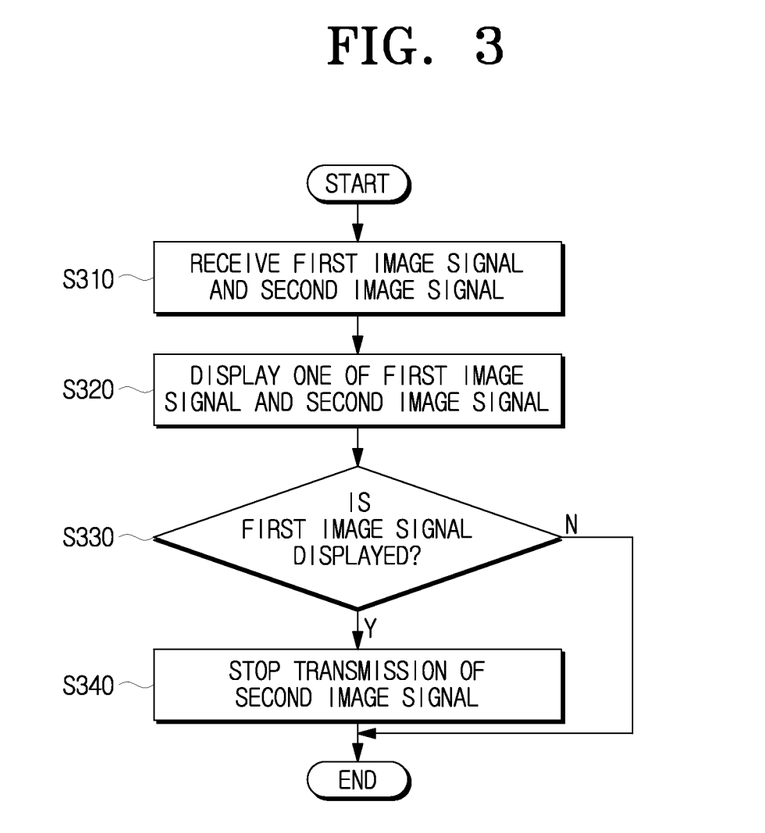
FIG. 3 is a flow chart illustrating a method for controlling an external device of an image display apparatus according to an exemplary embodiment of the present invention.

FIG. 3 is a flow chart illustrating a method for controlling an external device of an image display apparatus according to an exemplary embodiment of the present invention. More specifically, a method for controlling the external device 10, in the image display apparatus 100 including the first connector 110 and the second connector 120 which are connected to the external device 10 so as to receive image signals, will be explained below.

At operation S310, the image display apparatus receives a first image signal via the first connector 110 and receives a second image signal via the second connector 120. At operation S320, either the first image signal or the second image signal is displayed. In other words, if the first connector 110 or the second connector 120 is selected, an image signal input via the selected connector is displayed.

In this embodiment, the first image signal may be input via either a DVI connector or a D-sub connector, and the second image signal may be input via a USB connector.

If a displayed image signal is the first image signal at operation S330, transmission of the second image signal of the external device 10 connected via the second connector 120 is stopped at operation S340.

Transmission of the external device 10 may be stopped, by using a control signal for requesting interruption of image signal transmission, or by disabling the second connector 120 connected to the external device 10.

In more detail, transmission of the image signal of the external device 10 signal may be stopped, by generating a control signal to stop encoding of the second image signal and transmitting the generated control signal to the external device 10.

Alternatively, transmission of the image signal of the external device 10 may be stopped by disabling transmission lines (DM and DP) of the second connector 120 and thus cutting off data transmission and reception to and from the external device 10.

In another way, transmission of the image signal of the external device 10 may be stopped by cutting off a driving power supplied to a power line Vcc of the second connector 120 and thus disabling the power line Vcc of the second connector 120.

Figure 4:
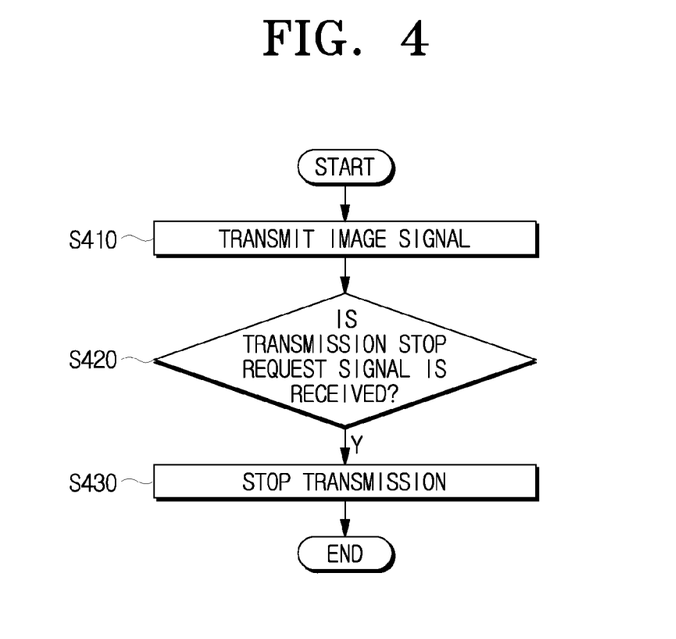
FIGS. 4 and 5 are flow charts illustrating transmission of an image signal of an external device according to the control of an image display apparatus according to an exemplary embodiment of the present invention.
Figure 5:
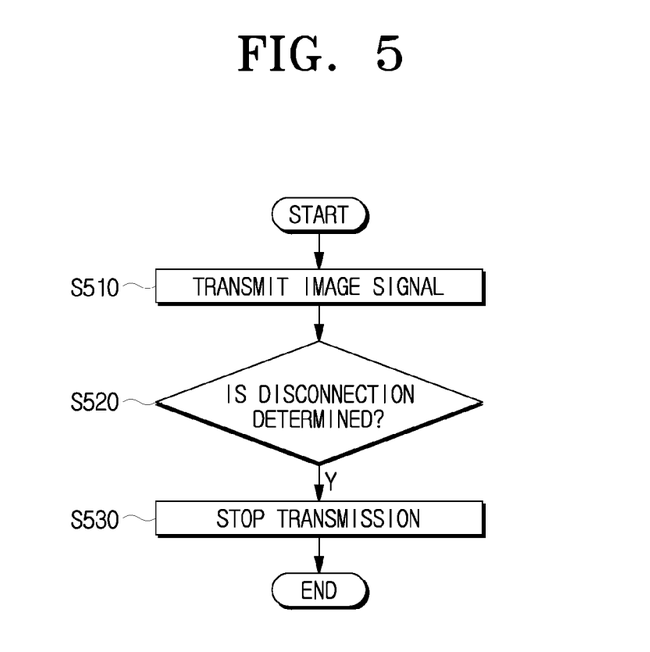

FIGS. 4 and 5 are flow charts illustrating transmission of an image signal of the external device 10 according to the control of the image display apparatus 100 according to an exemplary embodiment of the present invention.

With reference to FIG. 4, at operation S410, image signals selected by a user request are transmitted to the first connector 110 and the second connector 120 via a plurality of connectors provided on the external device 10. The first image signal is transmitted to the first connector 110 via the DVI connector or D-sub connector, and the second image signal is transmitted to the second connector 120 via the USB connector.

If a control signal for requesting that the second image signal transmission to the second connector 120 be stopped is received at operation S420, transmission of the second image signal is stopped in accordance with the request at operation S430. However, the first image signal is continuously transmitted to the first connector 110.

With reference to FIG. 5, at operation S510, image signals selected by a user request are transmitted to the first connector 110 and the second connector 120 via a plurality of connectors provided on the external device 10. The first image signal is transmitted to the first connector 110 via the DVI connector or D-sub connector, and the second image signal is transmitted to the second connector 120 via the USB connector.

If it is determined that the second connector 120 is disconnected at operation S520, transmission of the second image signal is stopped at operation S530.

The disconnection from the second connector 120 may be determined if no response to the transmitted second image signal is received, or if the connection to the connector is not sensed in accordance with a USB standard supporting a PnP function. In these cases, the external device 10 stops unnecessary operation such as the operation for the second image signal so that resources can be efficiently used.

As can be appreciated from the above description of the image display apparatus, an external device is directly or indirectly controlled by generating a control signal to stop an external device from transmitting an USB image signal so that availability of resources can be secured by reducing unnecessary consumption at the external device.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image display apparatus, comprising:
   a first connector and a second connector which receive an image signal, respectively;
   a display unit which selectively displays the image signal input via the first connector and the second connector; and a controller which causes an external device connected via the second connector to stop transmitting the image signal input via the second connector when the image signal input via the first connector is selected for display, wherein, when the image signal input via the first connector is selected for display, the controller generates a control signal which is used to interrupt transmission of image signal transmission and transmits the generated control signal to the external device via a data line of the second connector, the control signal including a specific request to interrupt the transmission of the image signal,
   wherein the second connector comprises a universal serial bus (USB) connector and receives the image signal from the external device in accordance with universal serial bus (USB) standard.

2. The image display apparatus of claim 1, further comprising a signal processing unit which decodes the image signal input via the second connector, and transmits the control signal to the external device via the data line of the second connector if the controller generates the control signal.

3. The image display apparatus of claim 1, wherein if the image signal input via the first connector is selected for display, the controller converts the second connector to a disabled state so that the external device stops transmitting the image signal.

4. The image display apparatus of claim 1, wherein if the image signal input via the first connector is selected for display, the controller disables a data transmission line which connects the second connector to the external device so that the external device stops transmitting the image signal.

5. The image display apparatus of claim 1, wherein the first connector comprises at least one of a digital visual interface (DVI) connector, HDMI connector and D-sub connector.

6. The image display apparatus of claim 1, further comprising an input unit which selects one of the first connector and the second connector,
   wherein the controller controls the display unit to display the image signal input via a connector selected through the input unit.

7. The image display apparatus of claim 1, wherein the controller is a CPU.

8. A method for controlling an image display apparatus comprising a first connector and a second connector, the method comprising:
   receiving an image signal via the first connector and the second connector, respectively;
   displaying the image signal input via the selected connector when one of the first connector and the second connector is selected; and
   transmitting a control signal to an external device connected via a data line of the second connector to stop transmitting the image signal input via the second connector when the image signal input via the first connector is selected for display, the control signal including a specific request to interrupt the transmission of the image signal,
   wherein the second connector comprises a universal serial bus (USB) connector and receives the image signal from the external device in accordance with universal serial bus (USB) standard.

9. The method of claim 8, wherein the control signal is an interruption signal.

10. The method of claim 8, wherein, if the image signal input via the first connector is selected for display, the second connector is converted to a disabled state by cutting off a driving power supplied to the second connector.

11. The method of claim 8, wherein the control signal is in accordance with DDC standard.

12. The method of claim 8, wherein the first connector comprises at least one of a digital visual interface (DVI) connector, HDMI connector and D-sub connector.

13. A method for controlling an image display apparatus comprising a first connector and a second connector, the method comprising:
   receiving an image signal via the first connector and the second connector, respectively;
   displaying the image signal input via the selected connector when one of the first connector and the second connector is selected; and
   via a specific request, stopping displaying of the received image signal from the second connector when the image signal input via the first connector is selected for display;

wherein the data transmission line which connects a data line of the second connector to an external device is disabled or is converted to a disabled state, wherein the second connector comprises a universal serial bus (USB) connector and receives the image signal from the external device in accordance with universal serial bus (USB) standard.

14. An image display apparatus, comprising:

a first connector and a second connector which receive an image signal, respectively;

a display unit which selectively displays the image signal input via the first connector and the second connector;

a power switch which supplies a driving power to the second connector; and a controller which causes an external device connected via the second connector to stop transmitting the image signal input via the second connector by controlling the power switch to cut off the driving power when the image signal input via the first connector is selected for display, wherein the power switch first cuts off the driving power to the second connector and then the external device connected via the second connector is caused to stop transmitting the image signal, wherein the second connector comprises a universal serial bus (USB) connector and receives the image signal from the external device in accordance with universal serial bus (USB) standard.

15. The image display apparatus of claim 14, wherein the power switch and controller are separate and distinct.

* * * * *